Patented Feb. 4, 1947

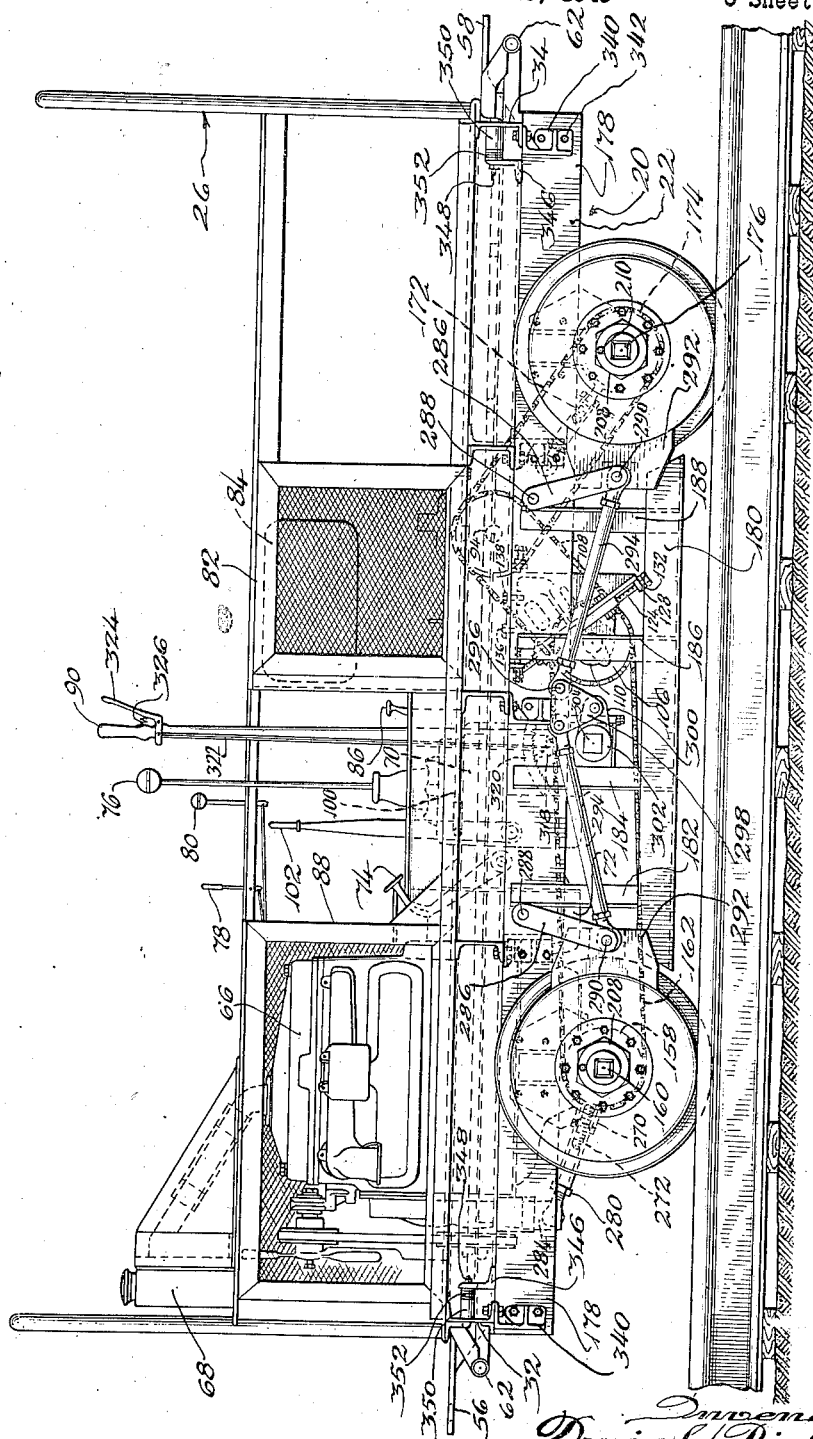

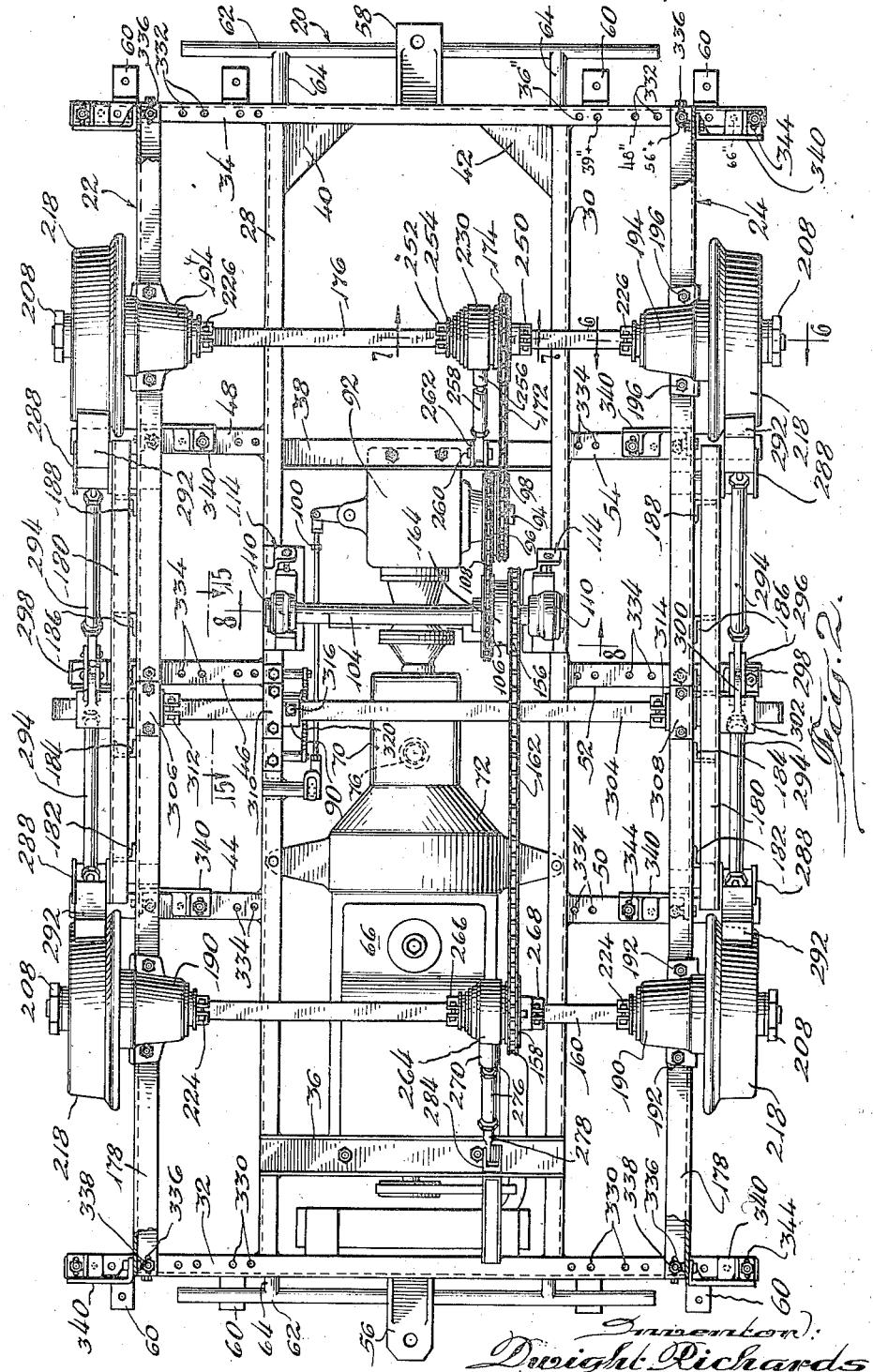

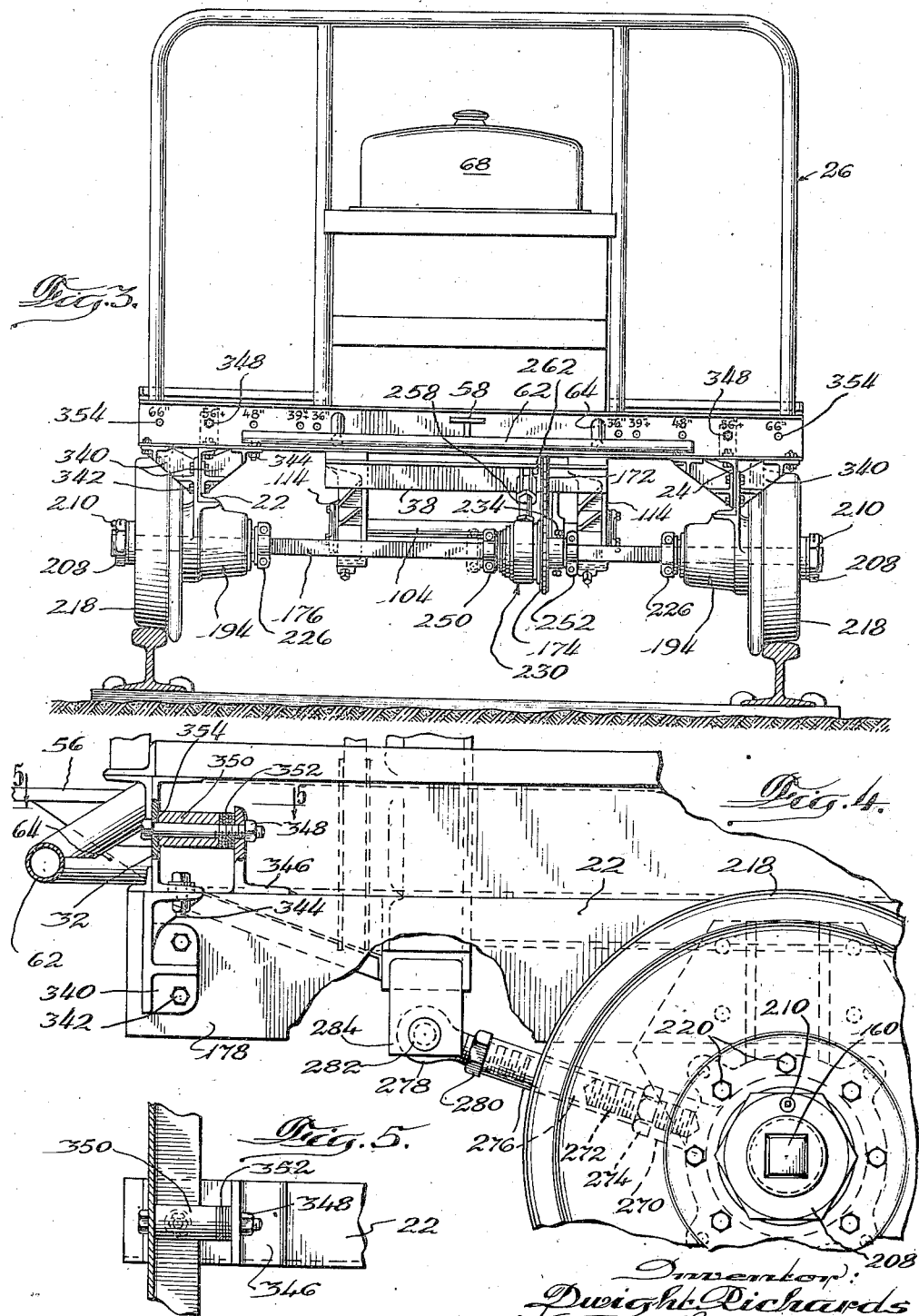

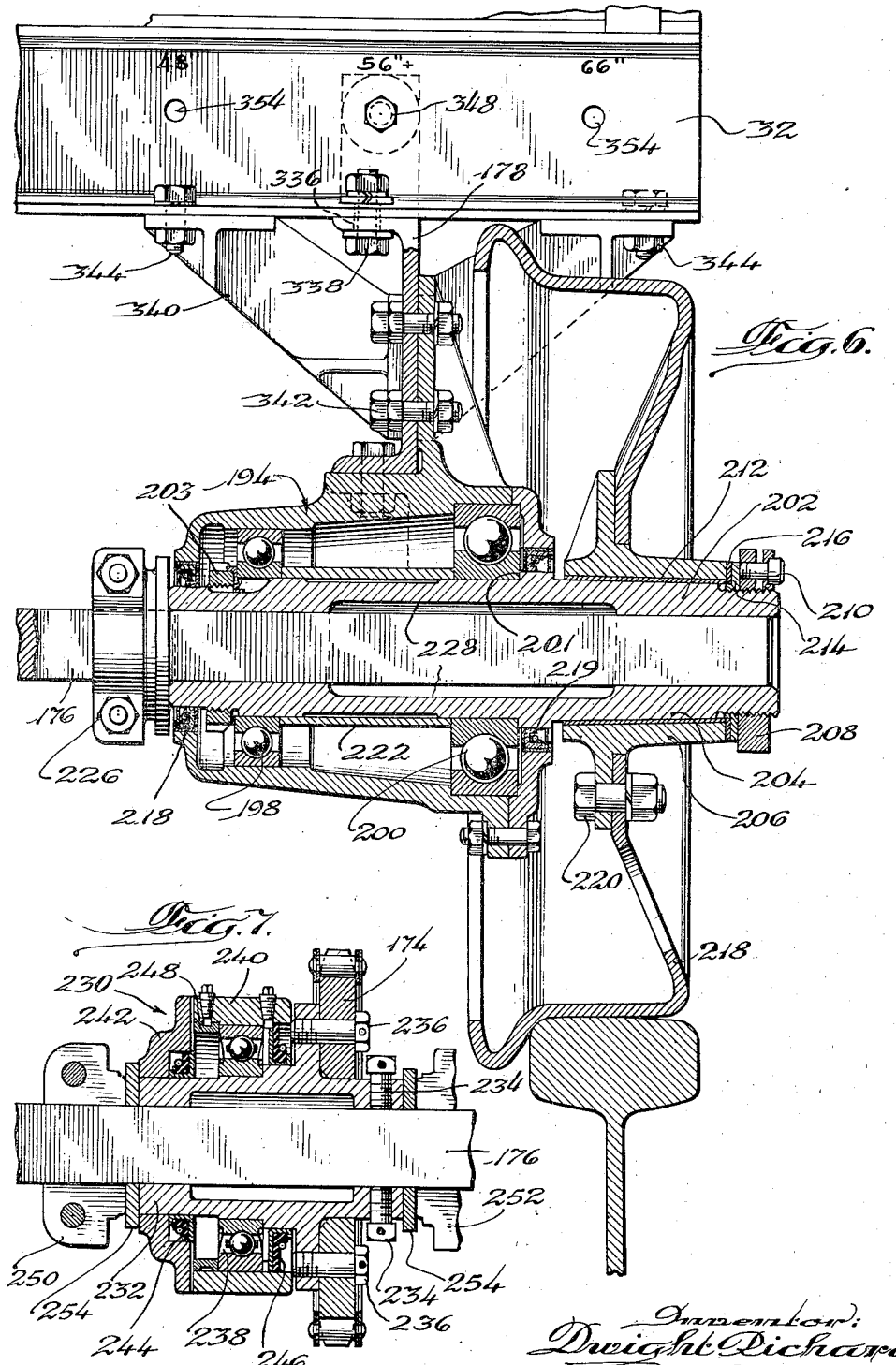

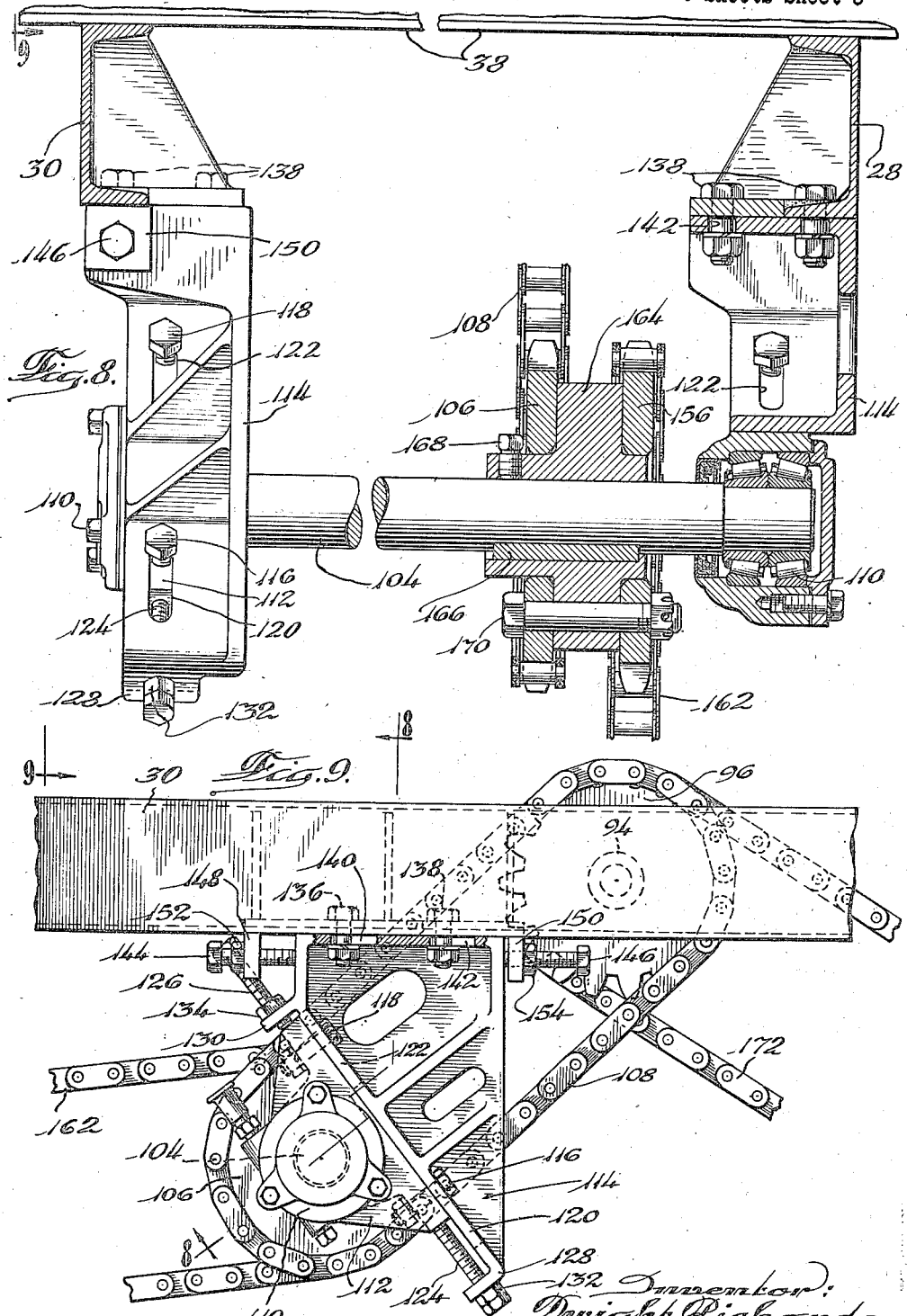

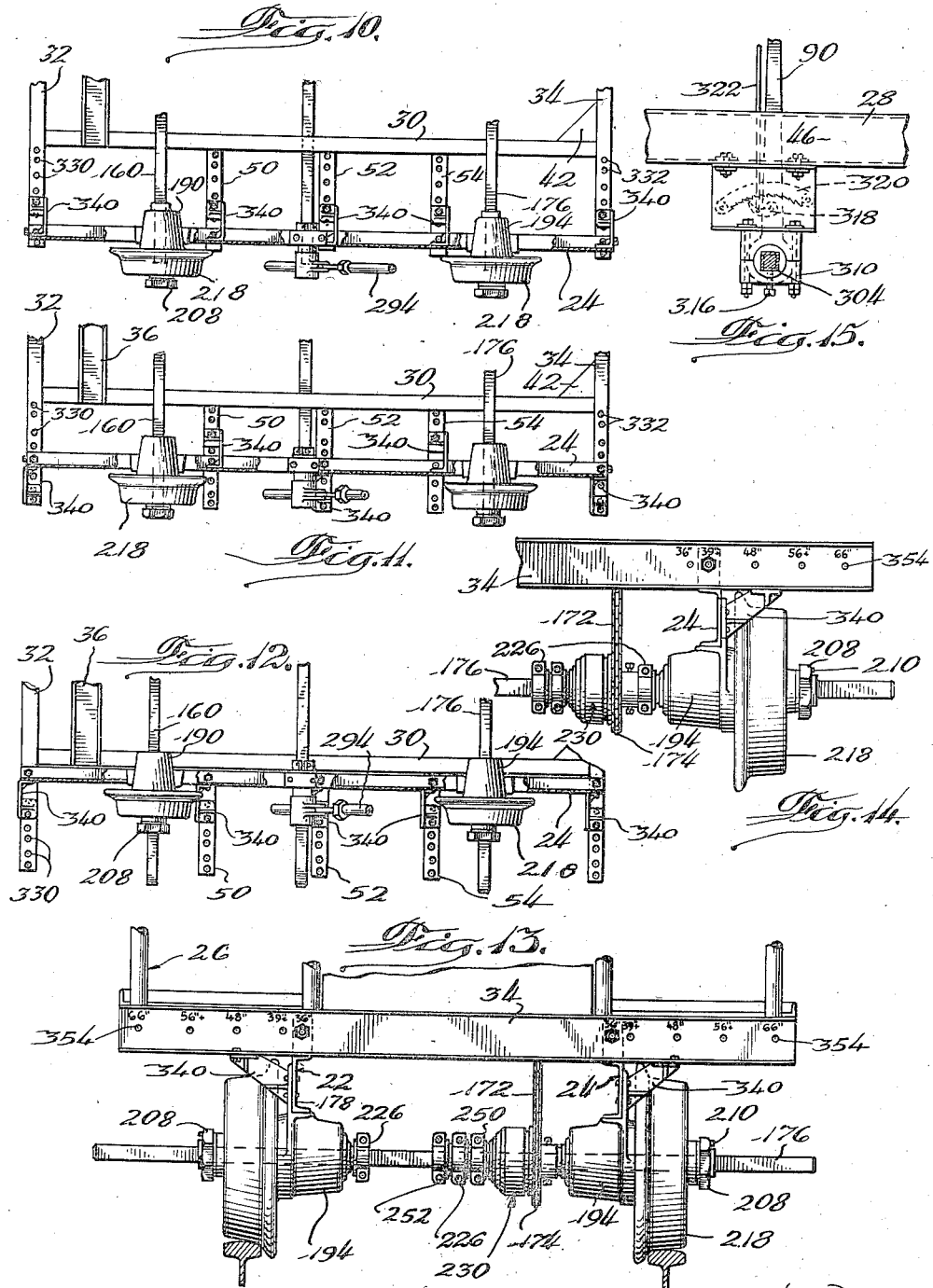

2,415,219

UNITED STATES PATENT OFFICE 2,415,219

VARIABLE GAUGE MOTOR CAR

Dwight Richards, Harvey, Ill., assignor to The Buda Company, Harvey, Ill., a corporation of Illinois Application November 10, 1943, Serial No. 509,716

5 Claims. (Cl. 105—101)

My invention relates to variable gauge motor cars and more particularly to variable gauge motor cars of the kind intended to operate on the rails of railroad tracks.

An object of my invention is to provide a variable gauge motor car which may be easily and quickly adjusted to different railroad gauges so that a single motor car may be readily converted to operate on any of the principal standard gauge railroad tracks of the world.

Another object of my invention is to provide a new and improved variable gauge motor car which is adapted to be used on railroad tracks having different gauges and which may be repeatedly and easily adjusted to the different gauges of the tracks over which it operates.

Another object of my invention is to provide a new and improved adjustable gauge motor car which is of simple and inexpensive design and which has a minimum number of different parts.

Another object of my invention is to provide a new and improved variable gauge motor car wherein adjustment to different track gauges does not change the driving connections between the engine and the car axle or axles.

Another object of my invention is to provide a new and improved variable gauge motor car wherein adjustments to conform to different track gauges do not interfere with the adjustment or arrangement of the braking mechanism.

Another object of my invention is to provide a new and improved variable gauge motor car having a maximum number of interchangeable parts whereby repair and replacement problems are simplified.

Another object of my invention is to provide a motor car having new and improved means for maintaining proper alignment of the wheels and axles relative to the body of the car.

Another object of my invention is to provide a motor car having novel means for adjusting the driving connections.

Another object of my invention is to provide a motor car having new and improved means for steadying the axles against the thrust of the driving connections.

Another object of my invention is to provide a variable gauge motor car which may be operated, adjusted to different gauges of track, serviced, and repaired by people of limited mechanical experience and ability.

Another object of my invention is to provide a variable gauge motor car which is sturdy and rugged and requires a minimum of attention.

Other objects and advantages will be come apparent as the description proceeds.

In the drawings:

Fig. 1 is a side elevation of a preferred embodiment of my invention;

Fig. 2 is a bottom plan view of the motor car shown in Fig. 1;

Fig. 3 is a rear view of the motor car of Fig. 1;

Fig. 4 is a partial side elevation on an enlarged scale with parts broken away to show details of construction;

Fig. 5 is a partial, sectional view taken on the line 5—5 of Fig. 4;

Fig. 6 is a partial, transverse, sectional view through one of the wheel bearings and associated parts and is taken on the plane of the line 6—6 of Fig. 2, but shows the parts in upright position;

Fig. 7 is a sectional view through an axle steady bearing and associated driving mechanism and is taken on the line 7—7 of Fig. 2;

Fig. 8 is an irregular, generally transverse section showing part of the driving connections and is taken on the lines 8—8 of Figs. 2 and 9;

Fig. 9 is an end view of the mechanism shown in Fig. 8 and is taken looking in the direction of the arrows 9—9 of that figure;

Fig. 10 is a partial, diagrammatic view showing the position of the wheels and side frames when the motor car is adjusted for a track having a 66 inch gauge;

Fig. 11 is a view similar to Fig. 10, but showing the position of the parts when the motor car is adjusted for a track having a 56½ inch gauge;

Fig. 12 is a view similar to Fig. 10, but showing the position of the parts when the motor car is adjusted for a track having a 36 inch gauge;

Fig. 13 is a partial end elevation showing the position of the wheels and associated parts when the motor car is adjusted for a track having a 36 inch gauge;

Fig. 14 is a partial view similar to Fig. 13, but showing the motor car adjusted for a track having a 39⅜ inch gauge; and Fig. 15 is a partial longitudinal section of certain brake mechanism and is taken on line 15—15 of Fig. 2.

Referring particularly to Fig. 2, it will be apparent that my variable gauge motor car has a chassis comprising a main frame 20 and a pair of side or wheel frames 22 and 24. The side frames 22 and 24 are adjustable laterally of the main frame 20 to adapt the motor car for use on railroad tracks having different gauges. A body or superstructure, indicated generally by reference numeral 26 in Fig. 3, is carried on the main frame 20. This superstructure may be in the form of a unitary body which is bolted or otherwise detachably secured to the frame 20, or this superstructure may assume the form of a plurality of independent parts separately attached to the main frame in any suitable manner. This body or supersructure may be of any suitable design intended primarily to carry either men or materials, or both men and materials as desired.

The main frame 20 comprises a pair of longitudinally extending channel members 28 and 30 and main transverse channel members 32 and 34 attached to the ends of the channel members 28 and 30. In addition to the channel members 32 and 34, the longitudinally extending channel members 28 and 30 are connected by cross members 36 and 38. Webbing 40 and 42 connects the rear ends of longitudinal channel members 28 and 30 to the rear transverse channel member 34 to stiffen the frame and hold the longitudinal and transverse channel members at right angles to each other. Outwardly extending arms 44, 46 and 48 are attached to the longitudinal channel member 28 and similar arms 50, 52 and 54 are attached to the longitudinal channel member 30.

The main frame 20 is provided with couplers 56 and 58 for attaching the motor car to one or more trailers to be pulled thereby. The transversely extending channel members 32 and 34 are also illustrated as being provided with brackets 60 for supporting the body or parts of the superstructure. The various parts of the main frame thus far described are preferably welded together to form a unitary structure, although the several parts of this frame may be bolted or riveted to each other, if preferred. A handle 62 is mounted in each end of the main frame by means of arms 64 which slide through openings in the channels 32 and 34 and extend into the ends of the longitudinal channels 28 and 30. These handles are so arranged that they can be shifted between retracted position wherein they lie closely adjacent the channels 32 and 34 to extended position wherein they are spaced away from these channels an appreciable distance. Such extensible handles provide a convenient means for removing the motor car from a railroad track and replacing it thereon.

The main frame supports a gasoline or any other suitable engine 66, shown as having a conventional liquid cooling system including a radiator 68 located at the forward end of the motor car. The engine is connected to a variable speed transmission 70 through the usual clutch located in a clutch housing 72. This clutch is controlled by a clutch pedal 74 and the transmission has the usual gear shift lever 76. In Fig. 1, I have shown a conventional spark control 78 and a conventional throttle control 80 conveniently located in front of the operator's seat 82, beneath which is located a fuel tank 84 connected to the engine carburetor in the usual manner. A starter button 86 is located adjacent the operator's seat and the rear wall 88 of the engine enclosure may be provided with the usual temperature and oil gauges and other instruments commonly used in vehicles of this type. A brake lever 90 is also located adjacent the operator's seat 82.

A reversing mechanism 92 is mounted on the main frame 20 and is interposed in driving relation between the transmission 70 and a driving shaft 94 carrying sprocket wheels 96 and 98. A linkage 100 connects the reversing mechanism 92 with a reversing lever 102 located adjacent the operator's seat.

A counter shaft 104 is also carried by the main frame and has a sprocket wheel 106 driven by a chain 108 from sprocket wheel 96 on drive shaft 94. This counter shaft is mounted in roller bearings 110 (Fig. 8) and each of these roller bearings is carried by a pedestal 112 (Fig. 9) slidably mounted on a movable bracket 114. Each pedestal is secured to its bracket 114 by bolts 116 and 118 passing through slots 120 and 122, respectively, in the bracket whereby the pedestal 112 may be moved longitudinally of the inclined face of its bracket when the bolts 116 and 118 are loosened. Each pedestal 112 is held in adjusted position relative to its bracket 114 by screws 124 and 126 located, respectively, in ears 128 and 130 of the bracket and secured in adjusted position by lock nuts 132 and 134.

Each bracket 114 is secured to one of the longitudinal channel members 28 or 30 by pairs of bolts 136 and 138 passing through slots 140 and 142, respectively, in the upper end of a bracket 114, whereby such bracket may be moved longitudinally of its supporting channel member when the bolts 136 and 138 are loosened. Each bracket 114 is held in longitudinally adjusted position by screws 144 and 146 mounted, respectively, in ears 148 and 150 attached to the associated channel members 28 or 30. The screws 144 and 146 are held in adjusted position by lock nuts 152 and 154.

Adjustment of the movable brackets 114 longitudinally of the channel members 28 and 30 is primarily for the purpose of spacing the sprockets 96 and 106 properly to give the desired tension on the chain 108 and to take up wear in this chain and these sprockets. The adjustment of the pedestal 112 along the inclined faces of the brackets 114, on the other hand, is intended primarily to position the sprocket wheel 156 the proper distance from the sprocket wheel 158 on front driving axle 160 to give the proper slack in the chain 162 which connects these sprocket wheels. As most clearly shown in Fig. 8, both of the sprocket wheels 106 and 156 carried by the counter shaft 104 are mounted on a hub 164 having a key 166 which causes this hub to rotate with the counter shaft. A set screw 168 prevents movement of the hub 164 axially of the shaft 104.

The sprocket wheels 106 and 156 are secured to the hub 164 by a plurality of bolts 170 and each of these sprocket wheels, as well as each of the other sprocket wheels used in the motor car, is preferably formed in two parts whereby any sprocket wheel can be readily removed and a new sprocket wheel substituted therefor without disassembling the shaft or axle upon which said sprocket wheel is mounted. A chain 172 connects the sprocket wheel 98 of the driving shaft 94 with a sprocket wheel 174 on the rear driving axle 176. Where it is unnecessary to drive through the front wheels and the rear wheels of the vehicle, the counter shaft 104 and chains 108 and 162 may be omitted.

Each side or wheel frame comprises a longitudinal channel member 178 and a skid rail 180 attached thereto by four uprights 182, 184, 186 and 188, Fig. 1. A front wheel pedestal or axle box 190, Fig. 2, is secured to each longitudinal channel 178 by bolts 192 and a rear wheel pedestal 194 is similarly secured to each longitudinal channel 178 by bolts 196. The pedestals 190 and 194 are identical and are best shown in Fig. 6. Each pedestal contains a pair of ball bearings 198 and 200 rotatably supporting a load axle 202 which is retained against displacement from its pedestal by shoulder 201 and nut 203. Each load axle has a tapered end 204 supporting a wheel hub 206 which is held in non-rotative relation to the axle casting 202 by a nut 208 threaded onto the extreme end of the load axle and secured in place by a lock screw 210 positioned in a split part of the nut 208.

A tapered insulating sleeve 212 is preferably interposed between the hub 206 and adjacent portion of the load axle 202 and a steel washer 214 and insulating washer 216 are preferably interposed between the nut 208 and adjacent end of the hub 206. A light weight wheel 218 is secured to the hub 206 by bolts 220 and is insulated from the load axle by sleeve 212 and washer 216. Sealing rings 218 and 219 are preferably provided to prevent escape of lubricant. A spacer 222 is located between the bearings 198 and 200.

Each load axle 202 is broached to provide a square opening therethrough to receive one end of one of the driving axles 176 or 160. These driving axles are of the same size and in the particular embodiment shown are formed of square bars 1½" on each side and 66½" long. The front driving axle is held in place by a pair of collars 224 each of which abuts one of the wheel pedestals 190 and the rear driving axle is similarly held against axial movement by a pair of collars 226 each abutting a wheel pedestal 194. The driving axles are freely slidable in the broached opening in the load axles, these broached openings being interrupted by cylindrical enlargements 228 (Fig. 6).

The central portion of the rear driving axle is braced against the pull of chain 172 by a steady bearing indicated generally by reference character 230. This bearing is shown in detail in Fig. 7 and comprises a hub 232 affixed to the driving axle by a pair of set screws 234. The two halves of the sprocket wheel 174 are attached to this hub by bolts 236. The hub 232 carries the inner race of a ball bearing 238 whose outer race is carried by a housing 240. A ring 242 closes the left hand end of the housing and sealing rings 244 and 246 prevent escape of lubricant therefrom. A spacing ring 248 locates the outer bearing race in the housing 240.

The hub 232 is located between a pair of clamps 250 and 252 and thrust washers 254 are interposed between the hub and these clamps. The housing 240 has an integral boss 256 (Fig. 2) connected by an adjustable thrust member 258 and pin 260 to ears 262 secured to the frame cross member 38. The pin 260 may be held in place by a cotter pin which is readily removable to permit removal of pin 260 and adjustment of the length of the thrust member 258 whose details of construction will be more fully explained in the description of the steady bearing for the front driving axle.

The front driving axle 160 is provided with a steady bearing 264 which is identical with the steady bearing 230. The bearing 264 is located between a pair of collars 266 and 268 and thrust washers identical with the thrust washers 254 are preferably interposed between these collars and the hub of the steady bearing 264. The housing of this bearing has an integral boss 270 (Fig. 4) into which one end of a stud 272 is screwed and secured by nut 274. The other end of stud 272 is screwed into a sleeve 276 which threadedly engages the end of an eye 278 held in adjusted position by nut 280.

A pin 282 attaches the eye 278 to a bracket 284 provided by the frame crossmember 36. The pin 282 is held in place by a cotter pin and can be easily removed, whereupon the eye can be adjusted lengthwise of sleeve 276 after first loosening nut 280. When the connection has been lengthened or shortened the desired amount, the nut 280 is tightened and pin 282 reinserted to attach eye 278 to bracket 284. While the connection between the car frame and the front steady bearing is under tension and the connection between the rear steady bearing and frame is under compression, these connections may be identical and have interchangeable parts.

A separate brake assembly is mounted on each of the side or wheel frames 22 and 24. Referring to Fig. 1, it will be seen that longitudinal channel 178 of each side frame has a pair of brake shoe supporting links 286 pivoted thereto by pins 288. The lower end of each link is pivotally attached by a pin 290 to a brake shoe 292. The brake shoes 292 are urged against the wheels by thrust members 294, each of which is connected at one end to a pivot pin 290 and at the other end to a pivot pin 296 carried by a pair of spaced triangular plates 298 which receive the ends of the thrust members 294 therebetween. The thrust members 294 and plates 298 constitute a toggle which is operated by an arm 300 to apply and release the brake shoes 292. The arm 300 is integral with a sleeve 302 having a square opening broached therethrough for slidably receiving one end of a brake rod 304.

The brake rod 304 is a square bar of the same size and length as the driving axles 160 and 176 and is interchangeable therewith. This brake rod is mounted in bearings 306 and 308 bolted to the channels 178 of the side frames 22 and 24, respectively, and in a bearing 310 attached to the longitudinal channel 28 of the main frame. Collars 312 and 314 hold the brake rod 304 against longitudinal movement. The lower end of the brake lever 90 is provided with a square opening slidably receiving the brake rod 304 and is affixed thereto by a set screw 316. This lever is provided with a pawl 318 (Fig. 15) which engages the teeth of a curved plate 320 bolted in spaced relation to the longitudinal channel 28. The pawl 318 is controlled by the usual link 322, handle 324 and spring 326 attached to the brake lever 90.

The side or wheel frames 22 are bolted to the main transverse panel members 33 and 34 of the main frame. The side frame 22 is also bolted to outwardly extending arms 44, 46 and 48 provided by the main frame, and the side frame 24 is likewise bolted to arms 50, 52 and 54 attached to the main frame. As clearly shown in Figure 2, the channel members 32 and 34 are provided with oppositely extending series of bolt holes 330 and 332, respectively, whereby the side frames 22 and 24 may be spaced at different distances to accommodate the motor car for use on railroad tracks of different gauges. Each of the main frame brackets is also provided with a similar series of bolt holes 334. The longitudinal channels 178 of the side frames have elongated bolt holes 336 spaced lengthwise of their upper flanges, whereby the upper flanges of the channel members 178 may be attached to the transfer channels and arms of the main frame by bolts 338. Each side frame is also braced by five angular gussets 340 secured by bolts 342 to the web of a channel member 178. Each of these gussets is secured by a bolt 344 to one of the transverse channels of the main frame or to one of the arms provided by this frame.

In the position of the side frame shown in Figure 2, two of the gussets 340 for each side frame extend inwardly from this frame and the other three gussets extend outwardly therefrom. The same arrangement of gussets is true for the side frame 24. As shown in Figure 2, the motor car is adapted for use on a railroad track of 56½ inch gauge and Figures 2 and 6, in this respect, correspond to diagrammatic Figure 11. This latter figure is one of a series comprising Figures 10, 11 and 12, diagrammatically showing the arrangement of the gussets 340 for different positions of the side frames. In Figure 10, the side frames are arranged to adapt the motor car for use on a railroad track of 66 inch gauge and in this position of the side frames all of the gussets 340 are on the inner sides of these frames. When the side frames are adjusted for either a 56½ inch gauge or a 48 inch gauge, part of the gussets are preferably located outside of each side frame and the alternating gussets are on the inside of these frames, as shown in Figure 11. When the side frames are adjusted for a railroad track of either 36 inch or 39⅜ inch gauge, all of the gussets are located outwardly of the side frames, as shown in Figure 12.

I have provided special means to insure proper alignment of the right hand and left hand wheels for all different positions of the side frames. Each side frame has a bracket 346 (Figs. 1 and 4) secured to the front and rear of its channel member 178. The forward bracket 346 is secured to the forward transverse channel member 32 by a bolt 348 surrounded by a sleeve 350 of predetermined length and a plurality of washers 352 of equal thickness. The rear bracket 346 is similarly secured to the rear channel member 34 by a bolt 348 surrounded by a sleeve 350 and a plurality of washers 352. The web of each channel member 32 and 34 is provided with a plurality of spaced bolt holes 354, as clearly indicated in Fig. 6, these series of bolt holes being adapted to receive the bolts 348 for different positions of the side frames.

Either side frame can be moved forward relative to the main frame by removing one or more of the washers 352 from in front of the forward bracket 346 and transferring these washers to the bolt 348 connecting the rear bracket 346 with the rear channel 34. Similarly, a side frame can be shifted rearwardly of the main frame by removing one or more washers 352 from between the rear bracket 346 and rear channel 34 and placing these washers between the forward bracket 346 and front channel 32. By maintaining the same number of washers 352 between the front channel 32 and the forward bracket 346 of each side frame, the two frames are maintained exactly opposite each other with the wheels of the two frames in proper alignment. The bolt holes 336 in the upper flanges of the channel members of the side frame are elongated to permit such shifting of the side frames, and the bolt holes in the gussets which receive the bolts 344 are similarly elongated for the same purpose, as clearly shown in Fig. 2.

In a country like Australia where it is frequently necessary to operate over railroad tracks of two or thee different gauges in order to complete a trip between given points, it is especially desirable to have a motor car which can be quickly, easily and rapidly adapted from one gauge to another by persons who are not especially skilled in mechanical structures. An important feature of my motor car lies in the particular construction and arrangement of the various parts whereby this can be accomplished.

In this connection I wish to point out particularly that the several collars or clamps which prevent longitudinal displacement of the driving axles and brake shaft and which position the steady bearings lengthwise of the driving axles are formed of two sections secured together by bolts which may be readily loosened or completely removed to permit shifting or transfer of these collars or clamps to accommodate the motor car to different track gauges. I have also found it advisable to mark plainly on the cross channels 32 and 34 of the main frame and on the several arms projecting from opposite sides of this frame, the track gauge from which each hole in these parts is to be utilized so that in shifting the side or wheel frames for different gauges, an unskilled person can readily determine the proper bolt holes for the bolts attaching the side frames 22 and 24, gussets 340 and brackets 346 to the appropriate members of the main frame. Such markings for some of the bolt holes are clearly indicated in Fig. 13, but no attempt has been made herein to show markings applied to each bolt hole, as is preferably done in the actual motor car.

In order to adapt my novel motor car to a different gauge of track, it is only necessary to jack up one side of the motor car at a time. This can be easily accomplished by placing two jacks beneath the motor car with one jack under each of the main channel members 32 and 34 and between the longitudinal channels 28 and 30, but nearest the longitudinal channel of the side to be raised. Before shifting either wheel frame to a new position, it is desirable that the axles be scraped clean of accumulated dirt or other matter which might be injurious to the axle bearings or housings, but this can be accomplished by anyone with no special training or experience. In order to complete the adjustment of the first side frame, it is necessary to make the following changes. The bolts 348 which connect the front and rear brackets 346 of that side frame to the front and rear transverse channels 32 and 34 must be shifted to the new position.

The bolts 344 which connect the gussets to the frame arms and transverse channels 32 and 34 must be shifted to new positions and under some circumstances certain of the gussets may have to be transferred from one side of the side frame channel 178 to the other side thereof, as explained in the description of Figs. 10, 11 and 12 showing the various arrangements of these gussets. The bolts connecting the upper flange of the longitudinal channel 178 of the side frame to the transverse channels and arms of the main frame must be shifted to new positions. The clamps 224 and 226 on the driving axles must be shifted to new positions and the clamp or collar 312 and 314 on the brake shaft must be transferred to new positions.

The connection between the brake lever and the brake shaft need not be disturbed and except where the motor car is being adapted for the two smallest sizes of tract, the collars which position the steady bearings need not be disturbed. When the motor car is being adapted for a track of 39⅜ inch gauge the righthand rear axle collar or clamp 226 is moved from the position shown in Fig. 3 to the position shown in Fig. 14 and the corresponding righthand collar of the front axle is transferred to a similar location in the position of the collar 226 shown in Fig. 14. This collar accomplishes no particular purpose, but is located in the particular position shown as a convenient means of maintaining this collar readily available for re-application to its normal position on the driving axle when the motor car is adjusted for a wider gauge. When the motor car is adjusted for a 36 inch track, both the righthand rear axle collar 226 and the righthand steady bearing axle clamp 252 must be shifted from the position shown in Fig. 3 and these clamps are preferably located as shown in Fig. 13. The corresponding clamps of the front axle are also shifted to a similar position.

After one side of the frame has been adjusted to the new position, the other side of the motor car is jacked or blocked up, and this other side frame is then shifted to the new position. The proper alignment of the frames relative to the main frame is perfectly maintained by simply keeping the same arrangement of the sleeves 350 and washers 352 on the aligning bolts 348.

A further feature of my invention lies in the interchangeability of the driving axles and brake rod, the wheel pedestals, steady bearings, clamping collars, and other duplicated parts. This greatly simplifies repair problems and minimizes the number of different kinds of repair parts which need be available. The various parts can readily be manufactured by conventional machinery and processes and of conventional materials and these parts can be made strong and durable so that a minimum of service attention is required.

While I have illustrated and described only a single form of my invention, my invention is not limited to the particular details shown and described, but may assume numerous other forms and my invention includes all modifications, variations and equivalents coming within the following claims.

I claim:

1. A motor car of the class described, comprising a main frame, a motor mounted thereon, a transmission mounted on said main frame and connected to said motor, a pair of adjustable struts pivotally connected to said main frame, a two-part sprocket wheel journaled in the free end of each of said struts, chains connecting said transmission with said sprocket wheels, said sprocket wheels having hubs with square openings therethrough, a pair of side frames, bolts for attaching said side frames to said main frame in different positions to adapt said motor car to different track gauges, a pair of wheel pedestals attached to each side frame, a load axle wholly mounted in each of said pedestals, a wheel affixed to each of said load axles, said axles having square openings therethrough, a pair of identical live axles of square cross section, each slidably received in the hub of one of said sprocket wheels and in a pair of aligned load axles, and adjustable clamps for holding said live axles against sliding movement relative to said wheels and sprocket wheels.

2. A motor car of the class described, comprising a main frame, a motor mounted thereon, a transmission mounted on said main frame and connected to said motor, a pair of sprocket wheels, chains connecting said transmission with said sprocket wheels, said sprocket wheels having hubs with square openings therethrough, a pair of side frames, bolts for attaching said side frames to said main frame in different positions to adapt said motor car to different track gauges, a pair of wheel pedestals attached to each side frame, a load axle wholly mounted in each of said pedestals, a wheel affixed to each of said load axles, said axles having square openings therethrough, a live axle of square cross section slidably received in the hub of one of said sprocket wheels and in a pair of aligned load axles, and adjustable clamps for holding said live axles against sliding movement relative to said wheels and sprocket wheels.

3. A motor car of the class described, comprising a main frame, a motor mounted thereon, a transmission mounted on said main frame and connected to said motor, a pair of adjustable struts pivotally connected to said main frame, a hub journaled in the free end of each of said struts, a two-part sprocket wheel detachably mounted on each hub, chains connecting said transmission with said sprocket wheels, means for adjusting said chains, said hubs having square openings therethrough, a pair of side frames, means for attaching said side frames to said main frame in different positions to adapt said motor car to different track gauges, a pair of wheel pedestals attached to each side frame, a load axle separately mounted in each of said pedestals, means preventing displacement of a load axle from its pedestal, a wheel affixed to each of said load axles, said axles having square openings therethrough, each of said openings having a central enlargement, a live axle of square cross section slidably received in the hub of each of said sprocket wheels and in a pair of aligned load axles, and adjustable clamps for holding said live axles against sliding movement relative to said wheels and sprockets.

4. A car adapted to be used on railroad tracks of different gauges and comprising a main frame, a pair of side frames, means for securing said side frames to different portions of said main frame to adapt said car to tracks of different gauges, said means permitting different positions of said side frames longitudinally of said main frame, wheels carried by said side frames, separate means associated with each side frame for determining its position longitudinally of said main frame, diagonal gussets for attaching each side frame to said main frame, and means providing for location of said gussets on different sides of their side frames for different track gauges.

5. A motor car of the class described, comprising a main frame, a pair of side frames, wheel pedestals attached to said side frames, each wheel pedestal carrying a pair of ball bearings, a load axle mounted in said bearings, means preventing displacement of said axle from said bearings, said load axles having tapered wheel receiving ends, wheels mounted on said tapered ends, driving axles slidably received in said load axles, and means on said main frame for driving said driving axles.

DWIGHT RICHARDS.

REFERENCES CITED

The following references are of record in the file of this patent:

UNITED STATES PATENTS

| Number | Name | Date |
|---|---|---|
| 1,216,063 | Buckingham et al. | Feb. 13, 1917 |
| 2,099,817 | Mahana | Nov. 23, 1937 |
| 137,308 | McCauley | Apr. 1, 1873 |
| 1,363,205 | Holdsworth | Dec. 21, 1920 |
| 1,494,965 | Szekely | May 20, 1924 |
| 1,219,930 | Ferriss | Mar. 20, 1917 |
| 2,346,370 | Eustis et al. | Apr. 11, 1944 |

FOREIGN PATENTS

| Number | Country | Date |
|---|---|---|
| 8,959 | British | Dec. 20, 1906 |